(12) United States Patent
Robertsson

(10) Patent No.: US 8,760,965 B2
(45) Date of Patent: *Jun. 24, 2014

(54) TIME LAPSE MARINE SEISMIC SURVEYING EMPLOYING INTERPOLATED MULTICOMPONENT STREAMER PRESSURE DATA

(75) Inventor: Johan Olof Anders Robertsson, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 1220 days.

This patent is subject to a terminal disclaimer.

(21) Appl. No.: 11/457,131

(22) Filed: Jul. 12, 2006

(65) Prior Publication Data

US 2006/0285435 A1 Dec. 21, 2006

Related U.S. Application Data

(63) Continuation-in-part of application No. PCT/GB2005/001855, filed on May 13, 2005.

(30) Foreign Application Priority Data

May 21, 2004 (GB) .................................. 0411305.6

(51) Int. Cl.
*G01V 1/38* (2006.01)
*G01V 1/30* (2006.01)

(52) U.S. Cl.
CPC . *G01V 1/38* (2013.01); *G01V 1/308* (2013.01)
USPC .................... 367/21; 367/15; 367/20; 702/17

(58) Field of Classification Search
USPC ............................. 367/21, 20, 15; 702/14, 17
See application file for complete search history.

(56) References Cited

U.S. PATENT DOCUMENTS

| | | | |
|---|---|---|---|
| 3,283,293 A | 11/1966 | Pavey, Jr. et al. | |
| 4,437,175 A * | 3/1984 | Berni ................................ | 367/24 |
| 4,648,080 A | 3/1987 | Hargreaves | |
| 4,752,916 A | 6/1988 | Loewenthal | |
| 4,937,793 A | 6/1990 | Shuck et al. | |
| 4,953,139 A | 8/1990 | Laster et al. | |
| 4,992,990 A | 2/1991 | Langeland et al. | |
| 5,309,360 A | 5/1994 | Monk et al. | |

(Continued)

FOREIGN PATENT DOCUMENTS

| | | |
|---|---|---|
| EP | 0515188 | 11/1992 |
| EP | 0515188 B1 | 2/1998 |

(Continued)

OTHER PUBLICATIONS

Kraaijpoel, D., 2003, Seismic ray fields and ray field maps: theory and algorithms, Ph.D. thesis, Utrecht University.

(Continued)

*Primary Examiner* — Ian J Lobo

(57) ABSTRACT

In a first aspect, a method for use in a time lapse, marine seismic survey includes accessing a set of acquired, multi-component seismic data; and interpolating a set of time lapse seismic data from the acquired seismic data. In other aspects, a program storage medium is encoded with instructions that, when executed by a computing device, perform the above method and a computing apparatus programmed to perform one or more of such methods.

25 Claims, 5 Drawing Sheets

(56) References Cited

U.S. PATENT DOCUMENTS

| | | | |
|---|---|---|---|
| 6,026,057 A * | 2/2000 | Byun et al. .................. 367/47 |
| 6,081,765 A | 6/2000 | Ziolkowski |
| 6,292,755 B2 | 9/2001 | Chambers et al. |
| 6,295,505 B1 | 9/2001 | Assa et al. |
| 6,438,069 B1 | 8/2002 | Ross et al. |
| 6,510,390 B1 | 1/2003 | Bunting et al. |
| 6,512,980 B1 | 1/2003 | Barr |
| 6,529,833 B2 | 3/2003 | Fanini et al. |
| 6,574,563 B1 * | 6/2003 | Nickel .................. 702/14 |
| 6,640,190 B2 | 10/2003 | Nickel |
| 6,836,448 B2 | 12/2004 | Robertsson et al. |
| 6,906,982 B2 | 6/2005 | Calvert |
| 6,977,867 B2 | 12/2005 | Chamberlain |
| 7,523,003 B2 * | 4/2009 | Robertsson et al. ........ 702/14 |
| 8,396,668 B2 * | 3/2013 | Robertsson .................. 367/24 |
| 2001/0005813 A1 | 6/2001 | Chambers et al. |
| 2002/0173917 A1 | 11/2002 | Nickel |
| 2003/0147306 A1 | 8/2003 | Robertsson |
| 2004/0042341 A1 | 3/2004 | Tenghamn et al. |
| 2004/0067002 A1 | 4/2004 | Berg et al. |
| 2005/0149267 A1 * | 7/2005 | Van Den Beukel et al. .... 702/14 |
| 2005/0194201 A1 | 9/2005 | Tenghamn et al. |
| 2005/0195686 A1 * | 9/2005 | Vaage et al. .................. 367/21 |
| 2006/0239117 A1 | 10/2006 | Singh et al. |
| 2006/0256653 A1 | 11/2006 | Toennessen et al. |
| 2007/0265785 A1 | 11/2007 | Robertsson |
| 2008/0008036 A1 * | 1/2008 | Morley .................. 367/21 |
| 2011/0128817 A1 | 6/2011 | Keers |

FOREIGN PATENT DOCUMENTS

| | | |
|---|---|---|
| GB | 2149503 A | 6/1985 |
| GB | 2256048 A | 11/1992 |
| GB | 23 63459 A | 12/2001 |
| GB | 2410551 | 8/2005 |
| GB | 2414299 | 11/2005 |
| WO | WO 98/28636 | 7/1998 |
| WO | WO 00/20895 | 4/2000 |
| WO | 02073239 | 9/2002 |
| WO | 02075363 | 9/2002 |
| WO | WO 2004/036254 | 4/2004 |
| WO | WO 2005/073758 | 8/2005 |
| WO | 2005/114258 A | 12/2005 |
| WO | 2008005775 | 1/2008 |

OTHER PUBLICATIONS

Eiken et al., "A proven method for acquiring highly repeatable towed streamer seismic data," *Geophysics*, 68(4):1303-1309, 2003.

Hale, "Stable explicit depth extrapolation of seismic wavefields," *Geophysics*, 56(11):1770-1777, 1991.

Robertsson et al., "Rough sea deghosting using a single streamer and a pressure gradient approximation," *Geophysics*, 67(6):2005-2011, 2002.

GeoStreamer starts to make waves—Equipment and Technology—Nov. 30, 2007, Offshore Shipping Online, http://www.oilpubs.com/oso/article.asp?v1=6959.

PGS deploys its first GeoStreamer 3D Vessel with eBird active positioning control system, Navigation News, Subsea News, Oct. 18, 2010; http://www.km.kongsberg.com/ks/web/nokbg0238.nsf/AllWeb/F85C9.

International Search Report and Written Opinion of PCT Application No. PCT/US2007/072365 (14-0307-PCT) dated Sep. 15, 2008: pp. 11.

Aronsen et al., "Time Will Tell: New Insights from Time Lapse Seismic Data," Oilfield Review, Summer 2007: pp. 6-15.

Druzhinin, "Anti-aliased Kirchhoff-Helmholtz transformations," Geophysical Prospecting, 1999, vol. 47: pp. 757-783.

Goff et al., "Interpolation of Fluvial Morphology Using Channel-Oriented Coordinate Transformation: A Case Study From the New Jersey Shelf," Mathematical Geology, Aug. 2004, vol. 36(6): pp. 643-658.

Ikelle et al., "Kirchhoff scattering series: Insight into the multiple attenuation method," Geophysics, Jan.-Feb. 2003, vol. 68(1): pp. 16-28.

Martin et al., "Acquisition of marine point receiver seismic data with a towed streamer," SEG 2000 Expanded Abstracts: pp. 1-4.

Rickett et al., "A cross-equalizaton processing flow for off-the-shelf 4D seismic data," 1998 SEG Annual Meeting, Sep. 1998: pp. 1-4.

Robertsson et al., "Rough-sea deghosting using a single streamer and a pressure gradient approximation," Geophysics, Nov.-Dec. 2002, vol. 67(6): pp. 2005-2011.

EP Search Report, dated Sep. 17, 2008, for Application No. EP 062700969.8.

* cited by examiner

TIME LAPSE MARINE SEISMIC SURVEYING EMPLOYING INTERPOLATED MULTICOMPONENT STREAMER PRESSURE DATA

BACKGROUND OF THE INVENTION

This is a continuation-in-part of co-pending International Application PCT/GB2005/001855, filed May 13, 2005, published Dec. 1, 2005, as Publication No. 2005/114258, now pending, and claiming priority to Application Serial No. GB 2 414 299 A, filed May 21, 2004, in the United Kingdom, which is hereby incorporated by reference for all purposes as if set forth verbatim herein.

This disclosure herein is related to the disclosure in U.S. application Ser. No. 11/457,125, entitled "Time Lapse Marine Seismic Surveying Employing Interpolated Multicomponent Streamer Pressure Data", filed on an even date herewith in the name of Johan Olof Anders Robertsson and commonly assigned herewith.

1. Field of the Invention

The present invention pertains to marine seismic surveying and, in particular, to time lapse surveys in a marine environment.

2. Description of the Related Art

Seismic exploration involves surveying subterranean geological formations for hydrocarbon deposits. A survey typically involves deploying acoustic source(s) and acoustic sensors at predetermined locations. The sources impart acoustic waves into the geological formations. The acoustic waves are sometime also referred to as "pressure waves" because of the way they propagate. Features of the geological formation reflect the pressure waves to the sensors. The sensors receive the reflected waves, which are detected, conditioned, and processed to generate seismic data. Analysis of the seismic data can then indicate probable locations of the hydrocarbon deposits.

Historically, seismic surveys only employed pressure waves and the receivers detected any passing wavefront. This sometimes leads to difficulties in processing. The art has therefore recently begun moving to "multicomponent" surveys in which, for example, not only is the passing of a wavefront detected, but also the direction in which it is propagating. Multicomponent surveys include a plurality of receivers that enable the detection of pressure and particle velocity or time derivatives thereof (hereafter referred to as "particle motion sensors"). In so-called dual sensor towed streamers, the streamer carries a combination of pressure sensors and particle motion sensors. The pressure sensor is typically a hydrophone, and the particle motion sensors are typically geophones or accelerometers. Knowledge of the direction of travel permits determination, for example, of which wavefronts are traveling upward and will yield useful information and which are traveling downwards and will yield undesirable information if confused with upwards traveling waves.

Some surveys are known as "marine" surveys because they are conducted in marine environments. Note that marine surveys may be conducted not only in saltwater environments, but also in fresh and brackish waters. Marine surveys come in at least two types. In a first, an array of streamers and sources is towed behind a survey vessel. In a second type, an array of seismic cables, each of which includes multiple sensors, is laid on the ocean floor, or sea bottom, and a source is towed from a survey vessel.

Accurate knowledge of source and sensor positions is important to the accuracy of the analysis. In land surveys, accurate positioning is not particularly difficult because environmental conditions are usually relatively stable. Sources and sensors can be readily positioned where desired and, once placed, they usually do not shift to any great degree. Marine surveys, however, are different altogether. In marine surveys, many factors complicate determining the position of the sensors, including wind, currents, water depth, and inaccessibility.

One increasingly common marine seismic survey technique is known as "time lapse seismic surveying." This technique essentially repeats earlier surveys over time to reveal changes in reservoirs of hydrocarbon deposits. One way to do this is to position the acoustic source(s) and receivers as close as is reasonably practicable to the positions of corresponding acoustic source(s) and receivers in the earlier survey(s). However, as was noted above, this is very difficult to do for marine surveys. A specification of how good the positions need to be in a time lapse survey is often defined in the contract with the client. When the positions of the acquired data do not fit the specifications, then the survey needs to reshoot some of the sail-lines, which is referred to as "infill". Shooting infill can be a very time-consuming and costly effort in a time lapse program.

The present invention is directed to resolving, or at least reducing, one or all of the problems mentioned above.

SUMMARY OF THE INVENTION

The present invention, in its various aspects and embodiments, includes a method and apparatus for use in a time lapse, marine seismic survey. In one aspect, the method comprises accessing a set of acquired, multicomponent seismic data; and interpolating a set of time lapse seismic data from the acquired seismic data. In other aspects, the invention includes a program storage medium encoded with instructions that, when executed by a computing device, perform the above method and a computing apparatus programmed to perform the above method.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1A:
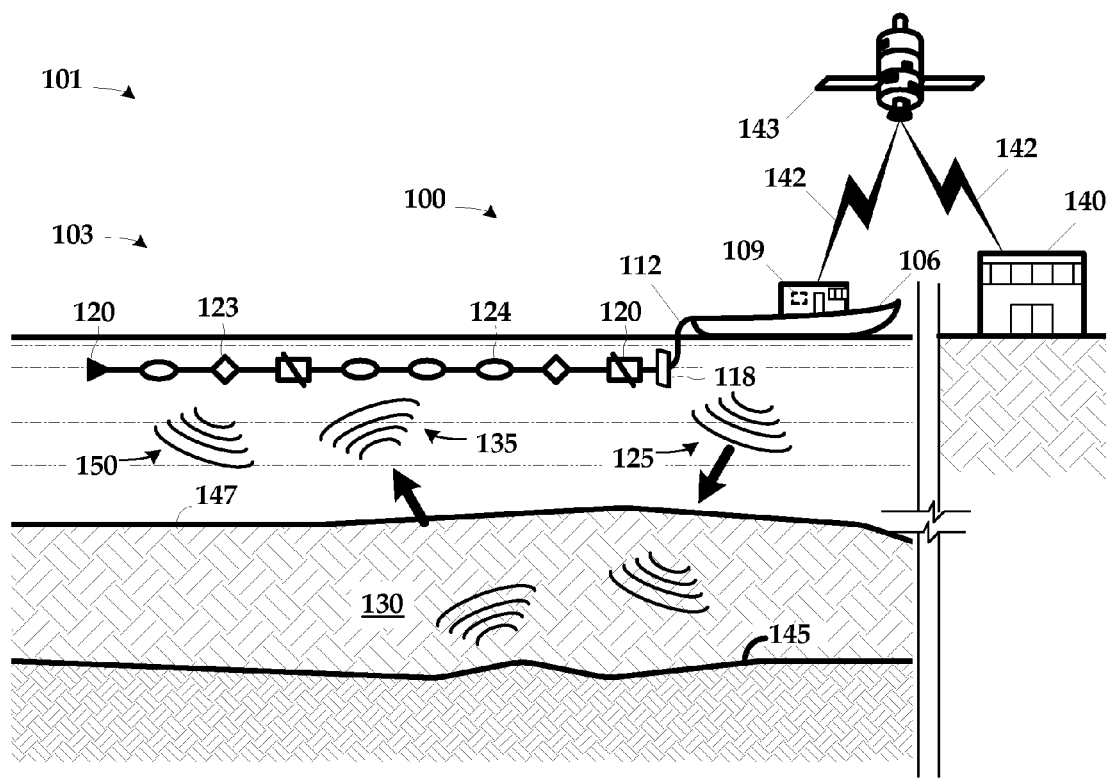
FIG. 1A and FIG. 1B depict a marine seismic survey practiced in accordance with one aspect of the present invention.
Figure 1B:
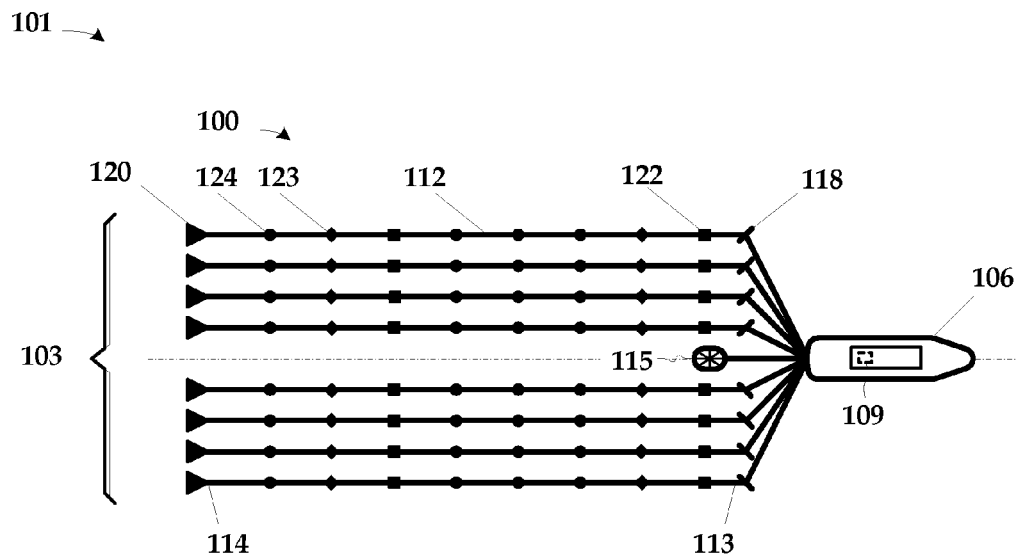

In general, and in a first aspect, the invention includes a method comprising accessing a set of acquired, multicomponent seismic data; and interpolating a set of time lapse seismic data from the acquired seismic data. As a prerequisite, the multicomponent seismic data must be acquired at some point. FIG. 1A and FIG. 1B illustrate a survey system 100 in a marine survey 101, both of which are exemplary embodiments of their respective aspects of the present invention. The marine survey 101 is a time lapse survey, i.e., a survey repeating an earlier, or baseline survey. Accordingly, hereafter, the marine survey 101 shall be referred to as a "time lapse survey." In this particular embodiment, the survey system 100 generally includes an array 103 towed by a survey vessel 106 on board of which is a computing apparatus 109. The towed array 103 comprises eight marine seismic cables 112 (only one indicated) that may, for instance, each be 6 km long. Note that the number of seismic cables 112 in the towed array 103 is not material to the practice of the invention. Thus, alternative embodiments may employ different numbers of seismic cables 112. In some embodiments, the outermost seismic cables 112 in the array 103 could be, for example, 700 meters apart.

A seismic source 115 is also shown being towed by the survey vessel 106. Note that, in alternative embodiments, the seismic source 115 may not be towed by the survey vessel 106. Instead, the seismic source 115 may be towed by a second vessel (not shown), suspended from a buoy (also not shown), or deployed in some other fashion known to the art. The known seismic sources include impulse sources, such as explosives and air guns, and vibratory sources which emit waves with a more controllable amplitude and frequency spectrum. The seismic source 115 may be implemented using any such source known to the art. In the illustrated embodiment, the seismic source 115 comprises an air gun or an array of air guns At the front of each seismic cable 112 is a deflector 118 (only one indicated) and at the rear of every seismic cable 112 is a tail buoy 120 (only one indicated). The deflector 118 laterally, or in the crossline direction, positions the front end 113 of the seismic cable 112 nearest the survey vessel 106. The tail buoy 120 creates drag at the tail end 114 of the seismic cable 112 farthest from the survey vessel 106. The tension created on the seismic cable 112 by the deflector 118 and the tail buoy 120 results in the roughly linear shape of the seismic cable 112 shown in FIG. 1.

Located between the deflector 118 and the tail buoy 120 are a plurality of seismic cable positioning devices known as "birds" 122. The birds 122 may be located at regular intervals along the seismic cable, such as every 200 to 400 meters. In this particular embodiment, the birds 122 are used to control the depth at which the seismic cables 112 are towed, typically a few meters. In one particular embodiment, the steerable birds 118 are implemented with Q-fin™ steerable birds as are employed by Western Geco, the assignee hereof, in their seismic surveys.

The principles of design, operation, and use of such steerable birds are found in PCT International Application WO 00/20895, entitled "Control System for Positioning of Marine Seismic Streamers", filed under the Patent Cooperation Treaty on Sep. 28, 1999, in the name of Services Petroliers Schlumberger as assignee of the inventors Øyvind Hillesund et al. ("the '895 application"). However, any type of steerable device may be employed. For instance, a second embodiment is disclosed in PCT International Application No. WO 98/28636, entitled "Control Devices for Controlling the Position of a Marine Seismic Streamer", filed Dec. 19, 1997, in the name of Geco AS as assignee of the inventor Simon Bittleston ("the '636 application"). In some embodiments, the birds 118 may even be omitted.

Figure 2:
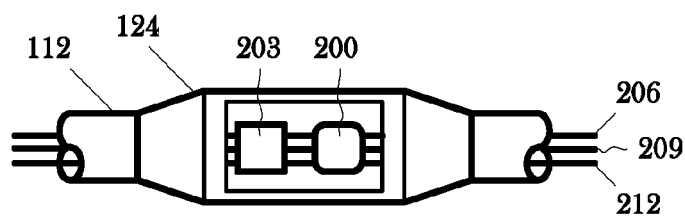
FIG. 2 conceptually depicts a sensor arrangement for the marine seismic survey of FIG. 1.

The seismic cables 112 also include a plurality of instrumented sondes 124 (only one indicated) distributed along their length. The instrumented sondes 124 house, in the illustrated embodiment, an acoustic sensor 200 (e.g., a hydrophone) such as is known to the art, and a particle motion sensor 203, both conceptually shown in FIG. 2. The particle motion sensors 203 measure not only the magnitude of passing wavefronts, but also their direction. The sensing elements of the particle motions sensors may be, for example, a velocity meter or an accelerometer. Suitable particle motion sensors are disclosed in:

U.S. application Ser. No. 10/792,51 1, entitled "Particle Motion Sensor for Marine Seismic Sensor Streamers," filed Mar. 3, 2004, in the name of the inventors Stig Rune Lennart Tenghamn and Andre Stenzel (published Sep. 8, 2005, as Publication No. 2005/0194201);

U.S. application Ser. No. 10/233,266, entitled "Apparatus and Methods for Multicomponent Marine Geophysical Data Gathering," filed Aug. 30, 2002, in the name of the inventors Stig Rune Lennart Tenghamn et al. (published Mar. 4, 2004, as Publication No. 2004/0042341); and U.S. Pat. No. 3,283,293, entitled "Particle Velocity Detector and Means for Canceling the Effects of Motional Disturbances Applied Thereto," naming G. M. Pavey, Jr. et al. as inventors, and issued Nov. 1, 1966.

Any suitable particle motion sensor known to the art may be used to implement the particle motion sensor 203. Thus, it would be possible to distinguish data representing upwardly propagating wavefronts, such as the reflections 135, from the downwardly propagating wavefronts, such as the multiple reflection 150.

In general, it is desirable for the noise measurements of the particle motion sensors 203 be taken as close to the point the seismic data is acquired by the acoustic sensors 200 as is reasonably possible. More distance between the noise data acquisition and the seismic data acquisition will mean less accuracy in the measurement of noise at the point of seismic data acquisition. However, it is not necessary that the particle motion sensor 203 be positioned together with the acoustic sensor 200 within the sensor sonde 124. The particle motion sensor 203 need only be located sufficiently proximate to the acoustic sensor 200 that the noise data it acquires reasonably represents the noise component of the acquired seismic data.

The sensors of the instrumented sondes 124 then transmit data representative of the detected quantity over the electrical leads of the seismic cable 112. The data from the acoustic sensors 200 and the particle motion sensors 203 may be transmitted over separate lines. However, this is not necessary to the practice of the invention. However, size, weight and power constraints will typically make this desirable. The data generated by the particle motion sensor 203 will therefore need to be interleaved with the seismic data. Techniques for interleaving information with this are known to the art. For instance, the two kinds of data may be multiplexed. Any suitable techniques for interleaving data known to the art may be employed.

Thus, the data generated by the sensors of the instrumented sondes 124 is transmitted over the seismic cable to the computing apparatus 109. As those in the art will appreciate, a variety of signals are transmitted up and down the seismic cable 112 during the seismic survey. For instance, power is transmitted to the electronic components (e.g., the acoustic sensor 200 and particle motion sensor 203), control signals are sent to positioning elements (not shown), and data is transmitted back to the vessel 110. To this end, the seismic cable 112 provides a number of lines (i.e., a power lead 206, a command and control line 209, and a data line 212) over which these signals may be transmitted. Those in the art will further appreciate that there are a number of techniques that may be employed that may vary the number of lines used for this purpose. Furthermore, the seismic cable 112 will also typically include other structures, such as strengthening members (not shown), that are omitted for the sake of clarity.

Returning to FIG. 1A and FIG. 1B, the computing apparatus 109 receives the seismic data (hydrophone as well as particle motion sensor data), and records it. The particle motion sensor data is recorded in, for example, a data storage in any suitable data structure known to the art. The particle motion sensor data can then be processed along with the hydrophone data to for instance suppress unwanted multiples. The computing apparatus 109 interfaces with the navigation system (not shown) of the survey vessel 106. From the navigation system, the computing apparatus 109 obtains estimates of system wide parameters, such as the towing direction, towing velocity, and current direction and measured current velocity.

In the illustrated embodiment, the computing apparatus 109 monitors the actual positions of each of the birds 122 and is programmed with the desired positions of or the desired minimum separations between the seismic cables 112. The horizontal positions of the birds 122 can be derived using various techniques well known to the art. The vertical positions, or depths, of the birds 122 are typically monitored using pressure sensors (not shown) attached to the birds 122.

Although drag from the tail buoy 120 tends to keep the seismic cables 112 straight, and although the birds 122 can help control the position of the seismic cables 112, environmental factors such as wind and currents can alter their shape. This, in turn, affects the position of the instrumented sondes 124 and, hence, the sensors 200, 203 (shown in FIG. 2). The shape of the seismic cable 112 may be determined using any of a variety of techniques known to the art. For instance, satellite-based global positioning system equipment can be used to determine the positions of the equipment. The Global Positioning System ("GPS"), or differential GPS, are useful, with GPS receivers (not shown) at the front and tail of the streamer.

In addition to GPS based positioning, it is known to monitor the relative positions of streamers and sections of streamers through a network of sonic transceivers 123 (only one indicated) that transmit and receive acoustic or sonar signals. Alternatively, or in addition to GPS, commonly employed acoustic positioning techniques may be employed. The horizontal positions of the birds 122 and instrumented sondes 124 can be derived, for instance, using the types of acoustic positioning system described in:

(i) U.S. Pat. No. 4,992,990, entitled "Method for Determining the Position of Seismic Streamers in a Reflection Seismic Measuring System", issued Feb. 12, 1991, to Geco A. S. as assignee of the inventors Langeland, et al. (the "'990 patent");

(ii) U.S. application Ser. No. 10/531,143, entitled "Method and Apparatus for Positioning Seismic Sensing Cables", filed Apr. 8, 2005, in the name of James L. Martin et al. (the "'143 application"); and (iii) International Application Serial No. PCT/GB 03/04476 entitled "Method and Apparatus for Determination of an Acoustic Receiver's Position", filed Oct. 13, 2003, in the name of James L. Martin et al. (the "'476 application").

However, any suitable technique known to the art for cable shape determination may be used.

The survey vessel 106 tows the array 103 across the survey area in a predetermined pattern. Since the survey is a time lapse survey, as mentioned above, the object is to place the sources 115 and sensors 200, 203 (shown in FIG. 2) of the instrumented sondes 124 in the same positions as the sources and receivers in the baseline survey during the acquisition. The predetermined pattern is therefore formulated to replicate as close as possible the baseline survey against which the time lapse survey is taken given the information available from the baseline survey and the anticipated conditions of the current survey. The predetermined pattern is basically comprised of a plurality of "sail lines" along which the survey vessel 106 will tow the array 103. Thus, at any given time during the survey, the survey vessel 106 will be towing the array 103 along a predetermined sail line 153.

Still referring to FIG. 1A-FIG 1B, the seismic source 115 generates a plurality of seismic survey signals 125 in accordance with conventional practice as the survey vessel 106 tows the array 103. The seismic survey signals 125 propagate and are reflected by the subterranean geological formation 130. The geological formation 130 presents a seismic reflector 145. As those in the art having the benefit of this disclosure will appreciate, geological formations under survey can be much more complex. For instance, multiple reflectors presenting multiple dipping events may be present. FIG. 1A-FIG 1B omit these additional layers of complexity for the sake of clarity and so as not to obscure the present invention. The sensors 200, 203 detect the reflected signals 135 from the geological formation 130 in a conventional manner.

The sensors 200, 203 (shown in FIG. 2) in the instrumented sondes 124 then generate data representative of the reflections 135, and the seismic data is embedded in electromagnetic signals. Note that the generated data is multicomponent seismic data. The signals generated by the sensors 200, 203 are communicated to the computing apparatus 109. The computing apparatus 109 collects the seismic data for processing. The computing apparatus 109 is centrally located on the survey vessel 110. However, as will be appreciated by those skilled in the art, various portions of the computing apparatus 109 may be distributed in whole or in part, e.g., across the seismic recording array 105, in alternative embodiments.

The computing apparatus 109 may process the seismic data itself, store the seismic data for processing at a later time, transmit the seismic data to a remote location for processing, or some combination of these things. Typically, processing occurs on board the survey vessel 106 or at some later time rather than in the survey vessel 106 because of a desire to maintain production. The data may therefore be stored on a portable magnetic storage medium (not shown) or wirelessly transmitted from the survey vessel 106 to a processing center 140 for processing in accordance with the present invention. Typically, in a marine survey, this will be over satellite links 142 and a satellite 143. Note that some alternative embodiments may employ multiple data collection systems 120.

Figure 3:
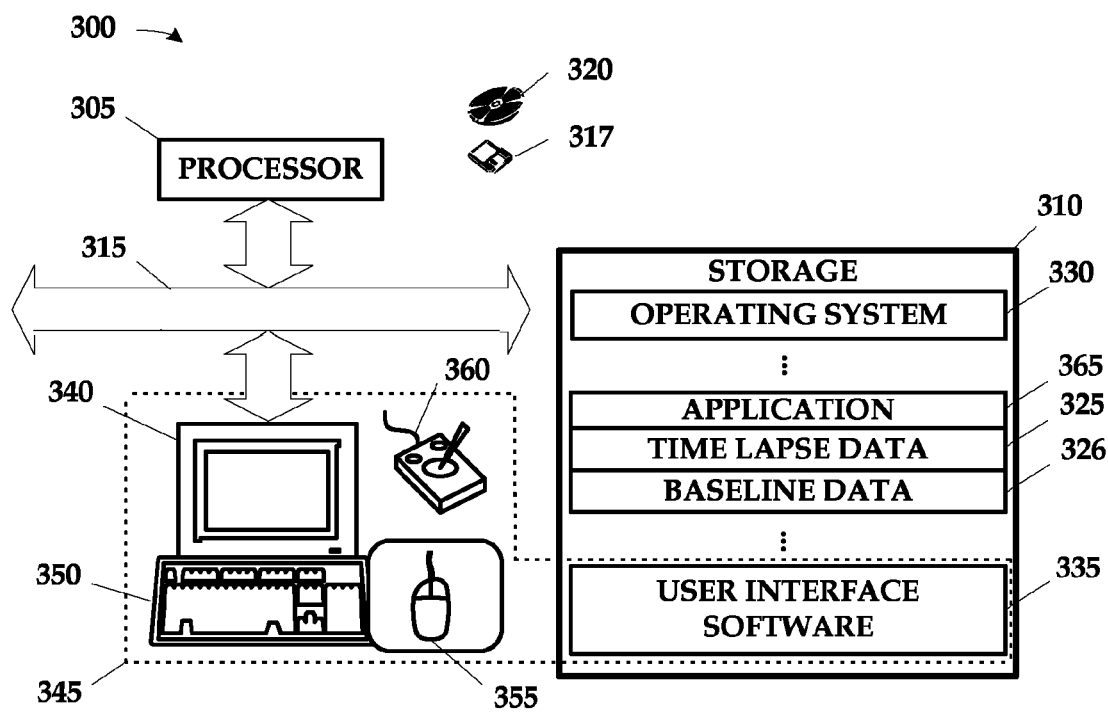
FIG. 3 shows selected portions of the hardware and software architecture of a computing apparatus such as may be employed in some aspects of the present invention.

In one aspect, the present invention is a software implemented method. FIG. 3 shows selected portions of the hardware and software architecture of a computing apparatus 300 such as may be employed in some aspects of the present invention. The computing apparatus 300 includes a processor 305 communicating with storage 310 over a bus system 315. The storage 310 may include a hard disk and/or random access memory ("RAM") and/or removable storage such as a floppy magnetic disk 317 and an optical disk 320.

The storage 310 is encoded with a time lapse data 325 and baseline data 326. The time lapse data 325 is acquired as discussed above relative to FIG. 2. The time lapse data 325 is multicomponent data and, in this particular embodiment, includes data from both of the sensors 200, 203. The baseline data 326, which is previously acquired "legacy data", is also shown encoded on the storage 310 although, as will be discussed further below, this is not necessary to the practice of the invention. Note that the time between acquisition of the baseline data 326 and the time lapse data 325 is not material to the practice of the invention.

The storage 310 is also encoded with an operating system 330, user interface software 335, and an application 365. The user interface software 335, in conjunction with a display 340, implements a user interface 345. The user interface 345 may include peripheral I/O devices such as a keypad or keyboard 350, a mouse 355, or a joystick 360. The processor 305 runs under the control of the operating system 330, which may be practically any operating system known to the art. The application 365 is invoked by the operating system 330 upon power up, reset, or both, depending on the implementation of the operating system 330. The application 365, when invoked, performs the method of the present invention. The user may invoke the application in conventional fashion through the user interface 345.

Figure 4:
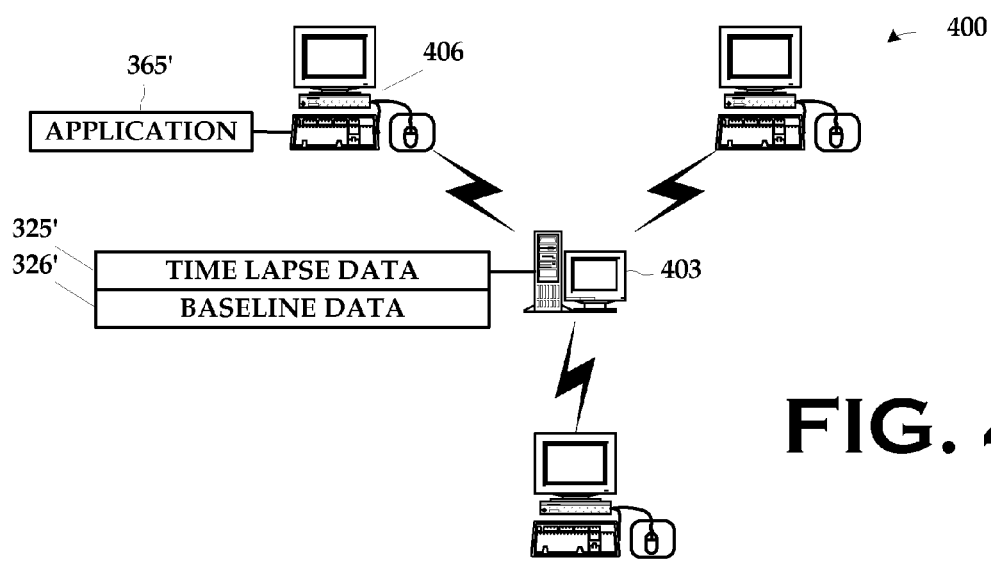
FIG. 4 depicts a computing system on which some aspects of the present invention may be practiced in some embodiments.

Note that there is no need for the time lapse data 325 to reside on the same computing apparatus 300 as the application 365 by which it is processed. Some embodiments of the present invention may therefore be implemented on a computing system, e.g., the computing system 400 in FIG. 4, comprising more than one computing apparatus. For example, the time lapse data 325 may reside in a data structure residing on a server 403 and the application 365' by which it is processed on a workstation 406 where the computing system 400 employs a networked client/server architecture. Furthermore, although the surface wave data set 326 is shown residing on the server 403, there is no requirement that the time lapse data 325 and the surface wave data set 326 reside together.

However, there is no requirement that the computing system 400 be networked. Alternative embodiments may employ, for instance, a peer-to-peer architecture or some hybrid of a peer-to-peer and client/server architecture. The size and geographic scope of the computing system 400 is not material to the practice of the invention. The size and scope may range anywhere from just a few machines of a Local Area Network ("LAN") located in the same room to many hundreds or thousands of machines globally distributed in an enterprise computing system.

Returning to FIG. 3, the time lapse data 325 contains the multicomponent seismic data acquired as described above. As has previously been noted, in an ideal situation, the locations of the source 115 and the sensors 200, 203 (shown in FIG. 2) in the instrumented sondes 124 will have been in the same positions during acquisition of the time lapse data 325 as were the source and receiver counterparts in the baseline survey. However, this is frequently not the case.

Figure 6A:
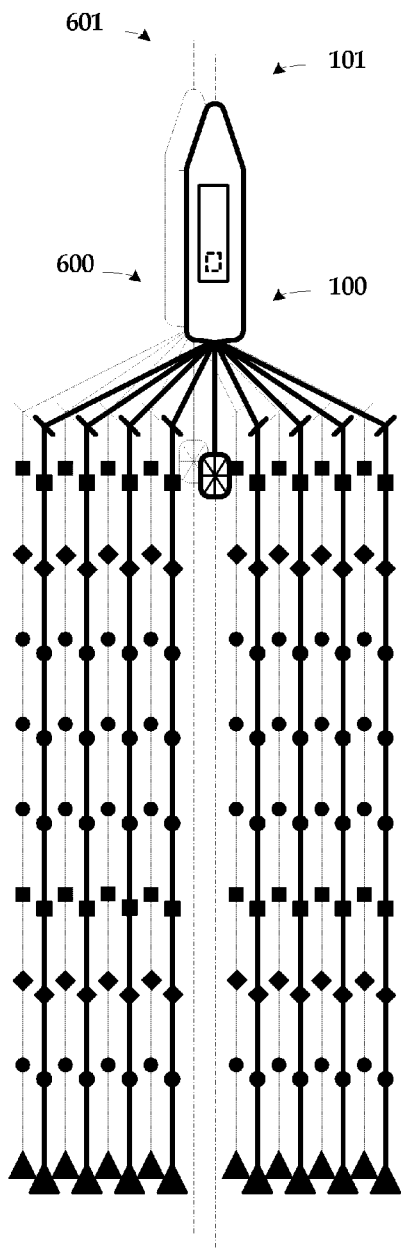
FIG. 6A depicts a time lapse survey offset from a base survey.

Consider the scenario in FIG. 6A, which illustrates how the survey system 100 in the time lapse survey 101 might be offset from the baseline survey 601, shown in broken lines. Note that the survey system 100 in the time lapse survey 101 is offset from the survey system 600 in the baseline survey 601 in both the inline and crossline directions. Such an offset might be caused by positioning or navigational errors. Environmental conditions may also induce such an offset. From the standpoint of the time lapse analysis, however, the cause of such offsets is not nearly so important as the fact of its existence.

Note that the offset shown in FIG. 6A is exaggerated somewhat for purposes of illustration. Typically streamers are separated 100 m apart in the cross-line direction. The interpolation technique disclosed herein may be able to accurately and reliably interpolate distances on the order of 10 m-30 m. Thus, the offset in the embodiment illustrated in FIG. 6A is in the range of approximately 10 m-30 m in both inline and crossline directions although it may appear larger in the drawing.

Offsets between the time lapse data and the baseline data generated in scenarios such as that shown in FIG. 6A are inimical to the time lapse analysis. Accordingly, as noted above, the present invention therefore employs, in another aspect, an interpolation technique. The art has since long experienced the need to interpolate or extrapolate trace recordings into areas void of receivers. Normally the wavefield and/or its derivatives are only known at a number of discrete locations. However, in practice it is often desirable to extend the knowledge of the wavefield to other points using interpolation, extrapolation or a combination of extrapolation arid interpolation, sometimes known as intrapolation. As used herein, the terms "interpolate" and "interpolation" will refer generally to any one of interpolation, extrapolation, and intrapolation unless noted otherwise to specifically mean interpolation to the exclusion of extrapolation and interpolation. Such techniques are applied, for example, to determine pressure data along the streamer, away from a streamer, at near-source offsets, or between two adjacent streamers. The present invention applies these concepts to the seismic data.

Figure 6B:
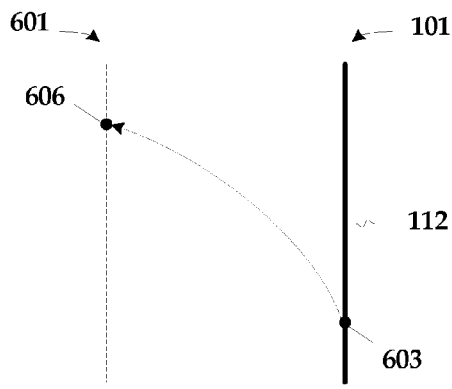
FIG. 6B graphically illustrates an interpolation for a single receiver position in the time lapse survey of FIG. 6A to the corresponding receiver position in the baseline survey.

FIG. 6B graphically illustrates one such interpolation for a single receiver position 603 in the time lapse survey 101 to the corresponding receiver position 606 in the baseline survey 601. Note that the above interpolation/extrapolation technique disclosed above operates in multiple dimensions. In FIG. 6B, the receiver positions 606 is interpolated in both inline and crossline directions to the position 603 as graphically represented by the arrows in broken lines. Recall, however, that the interpolation is a result of software implemented processing techniques. The embodiment illustrated in FIG.

6B only interpolates inline and crossline, but the technique can be applied to interpolate in the vertical, or z-axis, as well.

One suitable interpolation technique is disclosed in United Kingdom Patent Application GB 2 414 299 A, entitled "Interpolation and/or Extrapolation of Multi-Component Seismic Streamer Recordings", filed Jun. 21, 2004, filed in the name of Johan Olof Anders Robertsson, and published Nov. 23, 2005 ("the '299 application"). This application is hereby incorporated by reference as if expressly set forth verbatim herein for its teachings regarding interpolation/intrapolation. To further an understanding of the present invention, selected portions of that application are excerpted herein.

In this particular technique, the measured data from a multi-component streamer are used to derive a filter which interpolates or extrapolates pressure data away from the location of the streamer. The filter may be partially based on an expansion series of the pressure data. An expansion series is generally defined as a representation of the function or data set by means of a sum of increasing higher derivatives of the function or data set at a point or the space surrounding a point. One of the most used expansion series is the Taylor series. Whereas Taylor series are generally not suitable for extrapolating oscillatory functions over great distances, this technique is based on the realization that in seismic applications the waves arrive at the receivers with near vertical incidence. For certain applications, in particular for intrapolation between known points of the data set, it is a preferred variant of the present invention to use a Taylor series with modified weighting, more preferably weighting known as barycentric or triangular weighting.

Though expansion series have been proposed in seismic theory, they were severely restricted in real application because such expansions lead to cross-line terms which are difficult to evaluate. Lack of accurate particle velocity caused further problems: without such data, the errors made by intra- and extrapolation render the results unreliable. It has now been found that multi-component streamers are capable of providing sufficiently accurate particle velocity related data either directly or indirectly. In one embodiment, first-order cross-line derivatives of data in the filter or expansion series are substituted by in-line measurements of wavefield quantities only. In another embodiment, second-order cross-line derivatives of data in the filter or expansion series are further substituted by in-line derivatives and measurements of wavefield quantities. The expansion series is accurate to a first-order, more preferably to the second-order expansion term. It is desirable to extend the series into the highest order permitted by the available measurements of wavefield quantities. However, the terms involve more and more complex derivatives of the measured data. Hence such an extension is preferably limited to the term which can be replaced or expressed in terms of accurately measured data.

Figure 5:
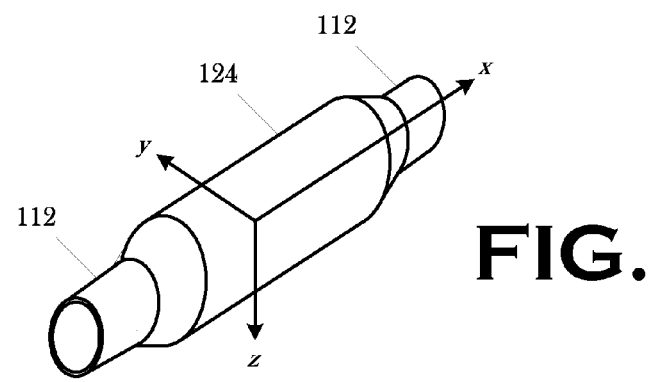
FIG. 5 illustrates the Cartesian coordinate system employed in the description of the illustrated embodiment.

More technically, during the survey 100, the source 115 is fired at intervals and the sensors 200, 203, shown in FIG. 2A, "listen" within a frequency and time window for acoustic signals such as reflected and/or refracted signals that are caused by seismic features in path of the emitted wavefield. As a result of such a survey, a set of pressure data P(x,y,t) and, by making use of the multi-component capability of the streamer, a set of velocity related data:

$$V(x,y,t) = (V_x(x,y,t), V_y(x,y,t), V_z(x,y,t)) \quad (2)$$

are obtained at locations x, y and times t. Note that the recorded data generally only available along 1D curves in 3D space following the streamers. Typically the streamers are approximately located in an xy-plane at roughly a constant depth z. The velocity is a vector with for example components in x, y and z directions. The coordinates are Cartesian coordinates, as illustrated in FIG. 5, with x as in-line direction, which is a direction parallel to the main axis of the seismic cable 112, and y as cross-line direction perpendicular to the seismic cable 112 axis and parallel to the (ideal) sea surface or plane in which the parallel streamers are towed. The z direction is taken to be vertical and orthogonal to x and y.

Applying the well-known Taylor's theorem, an analytic wavefield can be extrapolated away from a location where the wavefield and its derivatives are known:

$$P(x+\Delta x, y+\Delta y) = P(x,y) + [\Delta x \partial_x P(x,y) + \Delta y \partial_y P(x,y)] + \quad (3)$$
$$\frac{1}{2!}[(\Delta x)^2 \partial_{xx} P(x,y) + 2\Delta x \Delta y \partial_{xy} P(x,y) + (\Delta y)^2 \partial_{yy} P(x,y)] +$$
$$\frac{1}{3!}[(\Delta x)^3 \partial_{xxx} P(x,y) + 3(\Delta x)^2 \Delta y \partial_{xxy} P(x,y) +$$
$$3\Delta x (\Delta y)^2 \partial_{xyy} P(x,y) + (\Delta y)^3 \partial_{yyy} P(x,)] + O(\Delta^4)$$

where $O(\Delta^n)$ indicates the order of terms neglected in the Taylor expansion (n=4 in Eq. (3)) and the operator $\partial_x$ denotes a spatial partial derivative—in this instance with respect to the x-direction. The Taylor series is infinite and is valid for extrapolation any distance away from the location where the wavefield and its derivatives are known. The range of the extrapolation is limited by truncating the Taylor series. In the following examples pressure data are extrapolated.

An application of the general equation of motion yields $$\partial_x P(x,y) = \rho \dot{V}_y(x,y), \quad (4)$$

and $$\partial_y P(x,y) = \rho \dot{V}_y(x,y), \quad (5)$$

where $\dot{V}_x$, $\dot{V}_y$ denote time derivatives of $V_x$ and $V_y$, respectively, and $\rho$ is the density of water. Using Eq. (5) to replace the cross-line derivative of the pressure, all the terms required for the first-order accurate Taylor expansion of pressure away from the multicomponent streamer are available:

$$P(x+\Delta x, y+\Delta y) = P(x,y) + [\Delta x \partial_x P(x,y) + \Delta y \rho \dot{V}_y(x,y)] + O(\Delta^2). \quad (6)$$

In Eq. (6), the option exists of expressing in-line derivatives with respect to pressure in terms of derivatives of in-line component of particle velocity through Eq. (4). However, in the examples, the in-line derivatives of pressure are used throughout. A variant of Eq. (6) can be applied to expansions into z-direction.

The second-order cross-line derivative of pressure from a multicomponent streamer towed in the vicinity of the sea surface (e.g., at 6 m depth) can be expressed as:

$$\partial_{yy} P(x,y) = \quad (7)$$
$$\frac{3}{1+\frac{2}{15}k^2 h^2}\left[\frac{k\cot(kh)}{h}P(x,y) - \frac{i\omega\rho}{h}V_z(x,y)\right] - \partial_{xx} P(x,y) + O(h)$$

Eq. (7) is expressed in the space-frequency domain, h denotes the instantaneous depth of each recording element as a function of time and space, and k=ω/c is the wavenumber where ω is the angular frequency and c is the velocity in water. In order to be applicable for a time-variant rough sea, a space-time implementation using compact filters of Eq. (7) is used. This can be done successfully either by approximating the k-dependent terms by truncated Taylor expansions (equivalent to time-derivatives in the time domain) or by overlapping triangular windows where the wave-height is considered constant within each window.

Combining Eq. (3), Eq. (5), and Eq. (7), the Taylor expansion of pressure away from the multi-component streamer can be written as accurate up to the second order:

$$P(x+\Delta x, y+\Delta y) = P(x,y) + \left[\Delta x \partial_x P(x,y) + \Delta y \rho \dot{V}_y(x,y)\right] + \quad (8)$$
$$\frac{1}{2}\left[(\Delta x)^2 \partial_{xx} P(x,y) + 2\Delta x \Delta y \rho \partial_x \dot{V}_y(x,y)\right] +$$
$$\frac{(\Delta y)^2}{2}\left[\frac{3}{1+\frac{2}{15}k^2 h^2}\left[\frac{k\cot(kh)}{h}P(x,y) - \frac{i\omega\rho}{h}V_z(x,y)\right] - \partial_{xx} P(x,y)\right] + O(\Delta^3)$$

Having derived expressions of the first- and second-order Taylor expansion in terms of measurable data, these expressions can be applied as filter to various problems of interest to seismic exploration and data analysis. A practical filter may approximate analytical expressions such as derivatives by their corresponding finite difference approximations.

Thus, the applications for filters in accordance with the invention include generally the steps of obtaining the multi-component data using a multi-component streamer, using an expansion equation with cross-line terms replaced as described above, and using suitable computing devices to determine the inter- or extrapolated data.

The first of such problems relates to the interpolation and intrapolation of pressure data in the direction along a streamer so as to derive values of the dataset at points between the location of receivers. The problem of interpolating a wavefield between two points where the value of the wavefield and some of its derivatives are known is well-known in one dimension and is solved by fitting Hermite polynomials to the data.

The multi-component streamer will have some redundancy in in-line measurements if both P and $V_x$ are recorded. This redundancy may be exploited to attenuate noise in a multi-component streamer. For the case where there are recordings of both P and $V_x$ and in order to suppress noise on P by means of filtering the maximum required sensor spacing can be relaxed, if a sufficiently dense grid of data values can be generated through interpolation. As the noise on the geophone components will be spatially aliased, this method may require a model for predicting the noise on the geophone components once it is known on the pressure components.

Hermite polynomials allow us to interpolate P data from neighboring P and $V_x$ recordings between $x=x_0$ and $x=x_1$ even though the slowest propagating noise mode may be spatially aliased on the P recordings themselves:

$$P(x,y_0) = P(x_0,y_0)(2s^3 - 3s^2 + 1) + P(x_1,y_0)(-2s^3 + 3s^2) + \rho \dot{V}_x(x_0,y_0)(s^3 - 2s^2 + s) + \rho \dot{V}_x(x_1,y_0)(s^3 s - s_2) \quad (9)$$

where the Hermite polynoms are written as a function of:

$$s = \frac{(x-x_0)}{(x_1-x_0)} \quad (10)$$

A second application is the extrapolation away from a streamer.

To extrapolate pressure data away from a multicomponent steamer, but not into the direction of another multicomponent streamer, a one-dimensional Hermite interpolation can be applied along the streamer to the point along the streamer that has the shortest distance to the point to which the data is to be extrapolated. The interpolation along the streamer can be performed to an arbitrary degree of accuracy by computing derivatives in the streamer direction of the different terms needed for the Taylor extrapolation (Eq. (6) or Eq. (8)) with spectral accuracy, provided that the required terms are not spatially aliased. The Hermite interpolation, however, cannot be arbitrarily extended as by including ever higher-order derivatives more noise will be amplified.

The third problem relates to the interpolation and intrapolation of pressure data between two multi-component streamers. A Hermite interpolation can likely not be used cross-line in between the streamers as the terms for a subsequent Taylor extrapolation probably are aliased. Instead, one needs to derive a modified form of the Taylor intrapolation formulae to constrain the extrapolated wavefield between the neighboring streamers for this special case.

If the wavefield and its derivatives are known at the corners of a triangle and one would like to interpolate the wavefield to a point in the interior of the triangle, a first possible method is to use a 2D Taylor expansion for each of the three points (Eq. (2)) and then linearly interpolate or weight the three values according to their barycentric weights. However it has been shown that this will result in an intrapolated wavefield with one degree of accuracy less than what can be achieved if the Taylor expansion coefficients are modified slightly such that the interpolants are forced to fit the data at all corners of the triangle and not only one at a time. An example of the modified Taylor expansion can be found for example in a recent thesis by D. Kraaijpoel, "Seismic Ray Fields and Ray Field Maps: Theory and Algorithms", Utrecht University (2003).

Hence, to intrapolate the wavefield between two multi-component streamers the domain of receiver locations is triangulated such that each point in between the two streamers falls within a triangle with a receiver location at each corner. The wavefield is then extrapolated from each of the three recording locations to the interior point using the modified Taylor expansion. The data are then averaged using barycentric (triangular) weighting. The first- and second-order modified Taylor expansions of pressure are (see for example Kraaijpoel, 2003):

$$\tilde{P}(x+\Delta x, y+\Delta y) = P(x,y) + \frac{1}{2}\left[\Delta x \partial_x P(x,y) + \Delta y \rho \dot{V}_y(x,y)\right] + O(\Delta^2) \quad (10)$$

for the first-order expansion and as second-order expansion:

$$\tilde{P}(x+\Delta x, y+\Delta y) = P(x,y) + \frac{2}{3}\left[\Delta x \partial_x P(x,y) + \Delta y \rho \dot{V}_y(x,y)\right] + \quad (12)$$
$$\frac{1}{6}\left[(\Delta x)^2 \partial_{xx} P(x,y) + 2\Delta x \Delta y \rho \partial_x \dot{V}_y(x,y)\right] +$$
$$\frac{(\Delta y)^2}{6}\left[\frac{3}{1+\frac{2}{15}k^2 h^2}\left[\frac{k\cot(kh)}{h}P(x,y) - \frac{i\omega\rho}{h}V_z(x,y)\right] - \partial_{xx} P(x,y)\right] + O(\Delta^3).$$

There are different coefficients in front of the terms in Eq. (10) and Eq. (12) compared to the traditional Taylor expansions (Eq. (6) and Eq. (8)). Eq. (10) and Eq. (12) are best used when interpolating data in 2D and not for extrapolation. The triangularization can also be used when intrapolating between streamers on highly degenerated triangles. One side of such triangles is formed by the receiver spacing while the other two are determined by the much larger distance between streamers. Thus the above equations can be applied in the limit of $\Delta x \rightarrow 0$.

A fourth problem to which methods in accordance with the present invention can be applied is the intrapolation of pressure data at near source offsets.

This is a special case particularly important for applications in the field of multiple suppression. Generally, a survey obtains data from multiple adjacent streamers as shown in FIG. 1. But no data are available in the region closer to the source. However, at the source location symmetry conditions can be used in the interpolation such that the pressure data are symmetric across the location of the source. In other words, a Taylor expansion of the wavefield away from the source location will only contain even terms which are symmetric (pressure, second derivatives of pressure, etc.), but no odd terms which are anti-symmetric. The argument is correct for the direct wave and for the case of a one-dimensional (1D) model of the Earth but breaks down with variations in the sub surface. However, the symmetry is likely to be a strong additional constraint for extrapolation to near offsets. If the near-field source signature is known (e.g., by using the CMS™ technology of Westem-Geco), then such information may be added to constrain the interpolation of the direct arrival.

Finally, another special case is that of a multi-component streamer towed parallel to a conventional streamer recording P data only (P and all in-line spatial derivatives are known). Also for this case a modified form of the Taylor intrapolation formulae as above to constrain the extrapolation is likely to benefit from the fact that the pressure wavefield and its in-line derivatives are known along the conventional streamer.

Thus, a multicomponent streamer contains pressure recordings as well as recordings of particle motion. The equation of motion teaches us how to compute the gradient of the pressure data straight from the particle motion recordings, see the '299 application. In addition as also noted in the '299 application, the Laplacian of the pressure wavefield can also be computed when the multicomponent streamer is towed in the vicinity of the sea surface. With first- and possibly higher-order derivatives of the pressure wavefield available we can rely on interpolation techniques to provide better spatially sampled data (according to the Nyquist sampling theorem) even though the multicomponent streamers themselves are spaced too far apart to allow for interpolation using the pressure data only.

Note, however, that the interpolation/extrapolation technique first disclosed in the '299 application is but one such technique with which the invention may be implemented. Other suitable techniques are known to the art from their use in other contexts. Any suitable technique known to the art may be used in interpolating/extrapolation the acquired multicomponent seismic data to the source/receiver locations of the baseline survey that generated the legacy data or vice versa: in interpolating/extrapolation the acquired multicomponent seismic data baseline survey to the source/receiver locations of the repeat survey, or alternatively, both the base and repeat survey to a third location if both the base and repeat survey were acquired using a multicomponent acquisition system.

Figure 7:
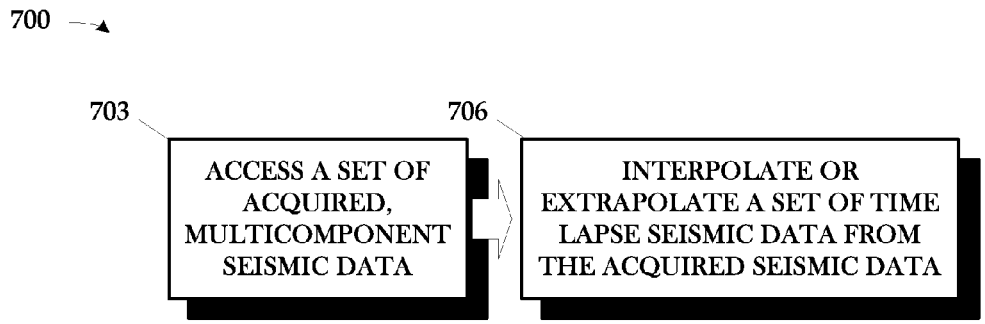
FIG. 7 illustrates a method in accordance with one particular aspect of the present invention, i.e., a method for use in a time lapse, marine seismic survey.

Thus, interpolation/extrapolation of actual receiver locations to those in the baseline data can be critical to isolate the time lapse response from noise introduced by deviations from the ideal time lapse survey. FIG. 7 illustrates a method 700 in accordance with one particular aspect of the present invention, i.e., a method for use in a time lapse, marine seismic survey. The method 700 comprises first accessing (at 703) a set of acquired, multicomponent seismic data. As noted above, the multicomponent seismic data will be stored, either temporarily in a buffer or in some more long term fashion, upon its acquisition. In the illustrated embodiment, it is stored in a more long term fashion. Note also that this implies that the multicomponent seismic data necessarily must have been relatively recently acquired; it, too, can be legacy data that has been archived for relatively longer periods of time. The method 700 then interpolates or extrapolates (at 706) a set of time lapse seismic data from the acquired seismic data.

Note that the present invention admits variation in implementation. For instance, in the embodiment illustrated above, the method of the invention may be applied to multicomponent seismic data where the baseline survey was carried out either with a conventional streamer or a multicomponent streamer. That is, it matters not whether the legacy data from the baseline survey is multicomponent seismic data. The embodiment extrapolates or interpolates the time lapse data (acquired using a multicomponent streamer) to the positions with which the baseline data was acquired. Similarly, the method can also be applied to cases where only the baseline survey was carried out with a multicomponent streamer whereas the repeat survey was acquired with conventional streamers recording pressure data. Finally, if the baseline data is also multicomponent seismic data, additional possibilities arise.

Figure 8A:
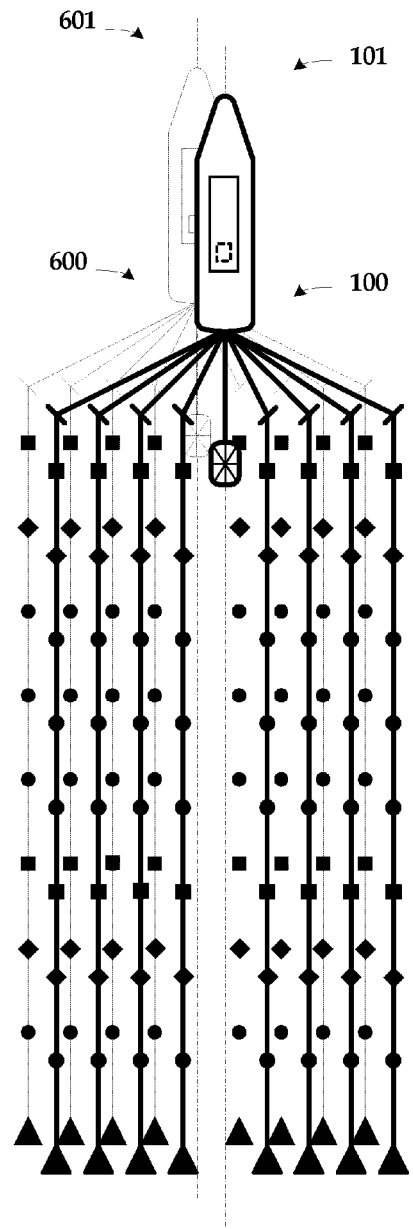
FIG. 8A depicts a time lapse survey offset from a baseline survey sufficiently that the interpolation from the time lapse survey to the baseline survey will introduce too much noise into the resultant data to be of value.

Consider the scenario in FIG. 8A, in which the offset between the baseline survey 601 and the time lapse survey 101 is sufficiently great that the extrapolation from the time lapse survey 101 to the baseline survey 601 will introduce too much noise into the resultant data to be of value. Note that both the time lapse survey 101 and the baseline survey 601 are conducted using multicomponent techniques and will generate multicomponent seismic data. Consequently, both the baseline survey 601 and the time lapse survey 101 can be extrapolated/interpolated to positions that lie somewhere in between the positions of the respective surveys, thus minimizing the noise due to mispositioning in the difference between the two surveys.

Figure 8B:
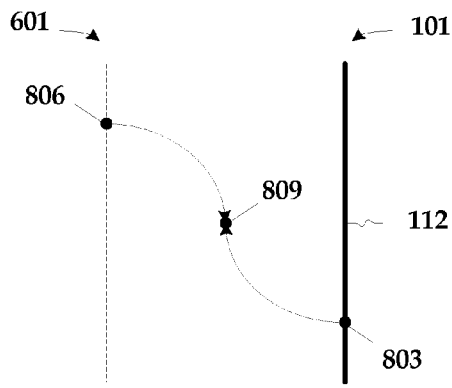
FIG. 8B graphically illustrates an interpolation for a single receiver position in the time lapse survey of FIG. 8A and the corresponding receiver position in the baseline survey to a common position.

FIG. 8B graphically illustrates one such interpolation for a single receiver position 803 in the time lapse survey 101 and the corresponding receiver position 806 in the baseline survey 601. Note that the above interpolation/extrapolation technique disclosed above operates in multiple dimensions. As in FIG. 6A, the offset shown in FIG. 8A is exaggerated somewhat for purposes of illustration. The offset here exceeds the nominal 10 m-30 m distance over which the interpolation method disclosed above accurately and reliably interpolates/extrapolates in one or more of the inline, crossline, and vertical dimensions. However, the offset does not exceed twice the nominal range, or 60 m.

In FIG. 8B, the receiver positions 803, 806 are both interpolated/extrapolated in both inline and crossline directions to the position 809 between the two as graphically represented by the arrows in broken lines. Recall, however, that the interpolation/extrapolation is a result of software implemented processing techniques. The embodiment illustrated in FIG. 8B only interpolates/extrapolates inline and crossline, but the technique can be applied to interpolate/extrapolate in the vertical, or z-axis, as well.

As is apparent above, some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

As was discussed above, a specification of how good positions need to be in a time-lapse survey is often defined in the contract with the client. When the positions of the acquired data do not fit the specs, we have to reshoot lines, which as referred to as "infill". It is anticipated that, on occasion, the present invention may not be sufficient to completely preclude the need for infill. Some embodiments may therefore include infill. However, even in these embodiments, it is anticipated that the present invention will greatly reduce the amount of infill needed, thereby providing substantial advantages over the state of the art.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for use in a time lapse, marine seismic survey, comprising:
   accessing a set of marine multicomponent seismic data comprising pressure and particle motion data acquired in a towed array, marine survey; and
   interpolating or extrapolating a set of time lapse seismic data by applying an interpolating and/or extrapolating filter to the set of marine multicomponent seismic data, wherein the interpolating and/or extrapolating filter uses spatial derivatives from the set of marine multicomponent seismic data.

2. The method of claim 1, wherein interpolating the set of time lapse seismic data includes intrapolating or extrapolating the set of time lapse seismic data.

3. The method of claim 1, wherein extrapolating the set of time lapse seismic data includes both interpolating and extrapolating the set of time lapse seismic data.

4. The method of claim 1, wherein the interpolating and/or extrapolating filter is based on an expansion series.

5. The method of claim 1, wherein the marine multicomponent seismic data include pressure data and particle motion data.

6. The method of claim 4, wherein cross-line derivatives of pressure data in the interpolating and/or extrapolating filter are replaced by functions of in-line measurements of wavefield quantities and/or derivatives of measurements of wavefield quantities.

7. The method of claim 1, wherein accessing the set of marine multicomponent seismic data includes accessing a set of legacy data.

8. The method of claim 1, wherein interpolating or extrapolating the set of time lapse seismic data includes interpolating or extrapolating a set of time lapse multicomponent seismic data.

9. The method of claim 1, further comprising:
   accessing a set of legacy multicomponent seismic data; and
   interpolating or extrapolating a second set of time lapse seismic data from the legacy multicomponent seismic data.

10. The method of claim 1, wherein the marine multicomponent seismic data was acquired in a baseline survey.

11. The method of claim 10, wherein the interpolated time lapse seismic data is single component seismic data.

12. The method of claim 11, wherein the interpolated time lapse seismic data is multicomponent seismic data.

13. The method of claim 1, wherein the marine multicomponent seismic data was acquired in a time lapse survey.

14. The method of claim 13, wherein the interpolated time lapse seismic data is single component seismic data.

15. The method of claim 13, wherein the interpolated time lapse seismic data is multicomponent seismic data.

16. A program storage medium encoded with instructions that, when executed by a processor, performs a method comprising:
   accessing a set of marine multicomponent seismic data comprising pressure and particle motion data acquired in a towed array, marine survey; and
   interpolating or extrapolating a set of time lapse seismic data by applying an interpolating and/or extrapolating filter to the set of marine multicomponent seismic data, wherein the interpolating and/or extrapolating filter uses spatial derivatives from the set of marine multicomponent seismic data.

17. The program storage medium of claim 16, wherein interpolating the set of time lapse seismic data in the method includes intrapolating or extrapolating the set of time lapse seismic data.

18. The program storage medium of claim 16, wherein accessing or extrapolating the set of time lapse seismic data in the method includes both interpolating and extrapolating the set of time lapse seismic data.

19. The program storage medium of claim 16, wherein accessing the set of marine multicomponent seismic data in the method includes accessing a set of legacy data.

20. The program storage medium of claim 16, wherein interpolating or extrapolating the set of time lapse seismic data in the method includes interpolating or extrapolating a set of time lapse multicomponent seismic data.

21. The program storage medium of claim 16, wherein the method further comprises:
   accessing a set of legacy multicomponent seismic data; and
   interpolating or extrapolating a second set of time lapse seismic data from the legacy multicomponent seismic data.

22. The program storage medium of claim 16, wherein the marine multicomponent seismic data was acquired in a baseline survey.

23. The program storage medium of claim 16, wherein the marine multicomponent seismic data was acquired in a time lapse survey.

24. The method of claim 1, wherein the set of time lapse seismic data includes data from at least one of the following:
   data along a streamer;
   data away from the streamer;
   data between two adjacent streamers;
   data at near source offsets; and
   multicomponent data around a single component streamer.

25. The method of claim 16, wherein the set of time lapse seismic data includes data from at least one of the following:
   data along a streamer;
   data away from the streamer;
   data between two adjacent streamers;
   data at near source offsets; and
   multicomponent data around a single component streamer.

* * * * *